C. S. BUZBY.
MIRROR SUPPORT.
APPLICATION FILED SEPT. 5, 1911.
1,029,420.
Patented June 11, 1912.
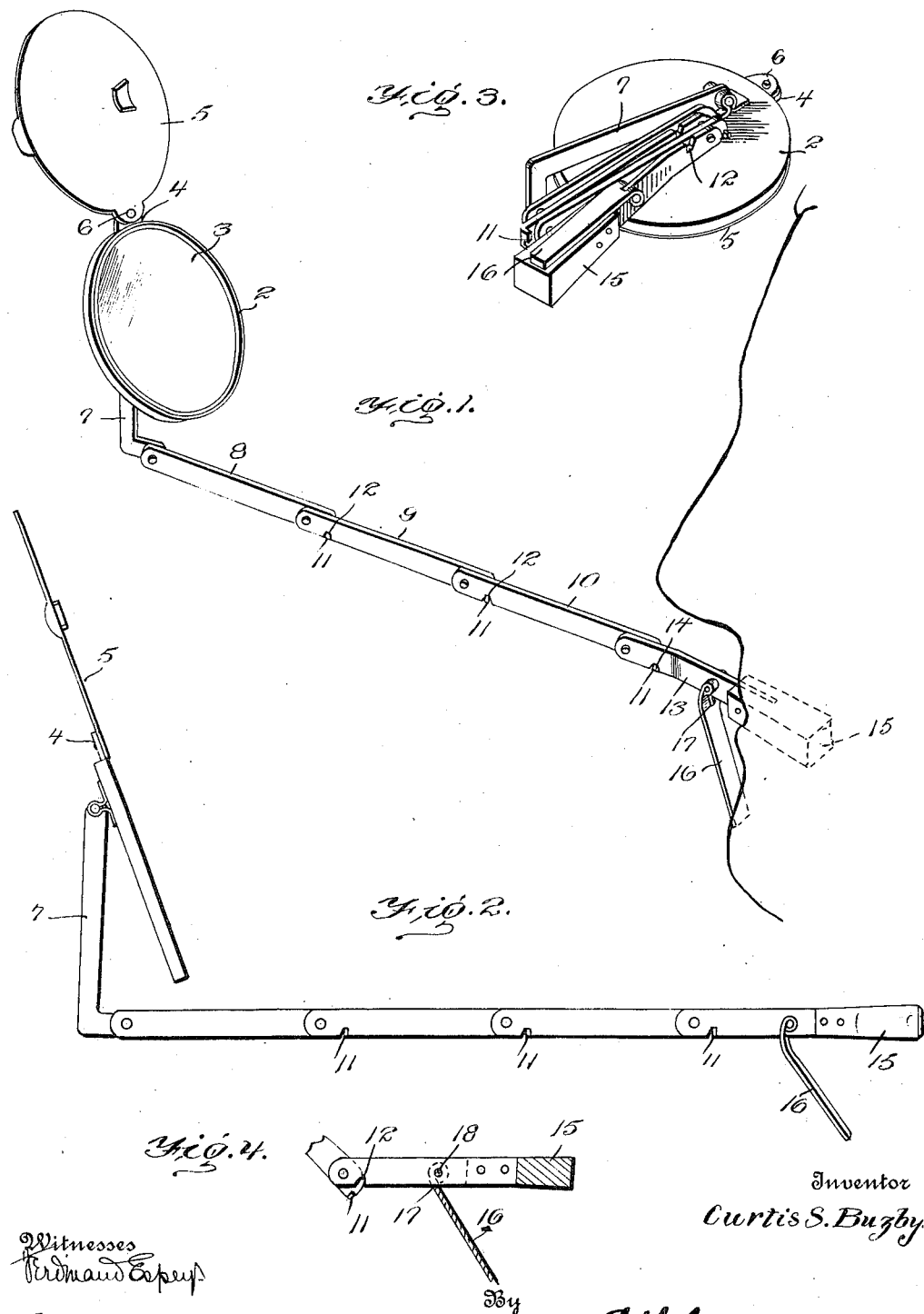
Inventor
Curtis S. Buzby
Witnesses
By A. W. Lacey
Attorney

UNITED STATES PATENT OFFICE.

CURTIS S. BUZBY, OF FRANKFORD, PENNSYLVANIA.

MIRROR-SUPPORT.

1,029,420.  Specification of Letters Patent.  Patented June 11, 1912.

Application filed September 5, 1911. Serial No. 647,788.

*To all whom it may concern:*

Be it known that I, CURTIS S. BUZBY, citizen of the United States, residing at Frankford, in the county of Philadelphia and State of Pennsylvania, have invented certain new and useful Improvements in Mirror-Supports, of which the following is a specification.

My invention relates to mirrors and the supporting means therefor, and particularly to a mirror designed to be carried in the pocket or reticule, said mirror being provided with means whereby it may be readily supported without the necessity of the user holding the mirror in the hands.

The primary object of the invention is to provide a very simple and efficient device of this description wherein the mirror support is so constructed that the mirror may be supported by the mouth of the user and adjusted so that the face of the user may be readily observed therein, the hands of the user being free.

A further object is to provide a mirror support as above described, but constructed of a plurality of links pivoted to each other, so arranged as to permit the mirror to be adjusted at a variety of different angles.

A further object is to provide a mirror inclosed within a case, the case being provided with a cover, the case being also provided with a plurality of jointed links, these links being pivoted to each other so that they may be folded up in parallel relation to bring the mirror and its support in small compass so that it may be readily fitted in a pocket or bag.

My improved toilet mirror is shown in the accompanying drawings wherein:

Figure 1 is a perspective view of my improved mirror when in use. Fig. 2 is a side elevation of the mirror and its support in an extended position. Fig. 3 is a perspective view of the closed mirror and the folded support. Fig. 4 is a detail, fragmentary, longitudinal section of the terminal link, mouth piece and chin rest.

Corresponding and like parts are referred to in the following description and indicated in all the views of the accompanying drawings by the same reference characters.

Referring to these drawings, it will be seen that 2 designates the mirror case which is preferably round and preferably formed with a bezel within which the mirror 3 is contained. The mirror 3 is preferably a convex mirror or diminishing mirror, though I do not wish to limit myself to this variety of mirror.

Projecting from the side of the mirror case is a lug 4, and pivotally attached to this lug is a rotatable cover 5 which is also provided with a lug 6 which overlaps the lug 4, the pivot pin for the cover passing through these coacting lugs. By this means the cover may be turned either into a position against the face of the mirror or out therefrom. The cover may be formed in any desired manner but is preferably provided with a finger-hold whereby it may be readily shifted and a limiting stop so that when it is snapped into place it will fit properly against the face of the mirror.

Pivoted to the rear of the mirror case is the angular leg or link 7 which is angularly bent at its free end. Pivoted to this free end of the link 7 are a plurality of links 8, 9 and 10 arranged in series, the link 8 being pivoted to the link 7, the link 9 being pivoted to the opposite end of the link 8 and the link 10 being pivoted to the link 9. All of the links 8, 9 and 10 are alike. Each link is provided at one end with the laterally projecting lug 11, and each link at the opposite end to the lug 11 is formed with a notch 12 in its lower edge with which the lug 11 on the next adjacent link engages when the links are turned to their opened position. It will be seen that when two adjacent links are turned into alinement with each other so that the lug 11 of one link engages in the notch 12 in the other link that the links will be held in said alinement and against any downward movement.

Pivotally attached to the extremity of the link 10 is the terminal link 13 which is also provided with a notch 14 on its under edge engaging with the lug 11 on the link 10. This link 13 is slightly deflected as seen in Fig. 3, and attached to the extremity of the terminal link is the block 15 of wood or other relatively soft material which forms a mouthpiece whereby the mirror may be firmly gripped between the teeth. I do not, of course, wish to limit myself to wood as the material for this mouthpiece. Preferably, however, the block 15 is of wood and is longitudinally kerfed for the insertion of the extremity of the link 13, the block being pinned to the link.

Pivotally attached to the terminal link 13 inward of the block 15 is a chin rest 16. This chin rest is bifurcated as at 17 to fit on each side of the link 13, and is pivoted by a pin 18. The bifurcation is relatively short so that the chin rest cannot move down to a position greater than that illustrated in Fig. 4 but may be moved upward against the under face of the mouthpiece 15.

A construction such as above described may be folded up into small compass as illustrated in Fig. 3, the several links 7, 8, 9, 10 and 13 being foldable into parallelism with each other. The mirror case 2 is folded inward against the supporting link 7 and the folded links 8, 9, 10 and 13 are folded against the cover 5. Thus folded, the device is extremely compact and may be readily carried within a pocket or bag. When unfolded in the position shown in Fig. 1, the mouthpiece is intended to be gripped by the teeth of the user with the chin rest supported against the chin and steadying the entire device, thus taking the strain off of the teeth. The supporting links 7 may be turned in any desired angular relation to the links 8, 9 and 10 and the mirror turned to any desired angle with relation to the supporting member. Inasmuch as the mirror 3 is convex, a diminishing image of the face of the user will be seen within the mirror. It will be seen that this mirror being held between the teeth of the user will permit the hands to be used for adjusting the hair, etc., and that this will be of great convenience, especially to ladies.

What I claim is:

1. As an article of manufacture, a mirror and a support therefor and attached thereto, including a mouthpiece adapted to be gripped between the teeth of the user, and a chin rest pivoted to said support adjacent to the mouthpiece and movable into or out of a position parallel to the mouthpiece.

2. The combination with a mirror, of an angular supporting link pivoted thereto to permit the mirror to move in a plane parallel to the angular link, a series of supporting links pivoted to the terminal end of the angular link for movement in planes parallel to the plane of the angular link, means on each link engaging the next adjacent link to limit the relative movement of the links in one direction, and a mouthpiece attached to the terminal link.

3. The combination with a mirror, of an angular supporting link having a long and a short arm, the mirror being pivoted to the terminal end of the long arm, the mirror being disposed in a plane at right angles to the plane of the angular link, a series of supporting links pivoted to each other, the terminal link of the supporting links being pivoted to the short end of the angular link, said supporting links having movement in planes parallel to the plane of the angular link, means on each link engaging the next adjacent link to limit the relative movement of the links in one direction, and a mouthpiece attached to the terminal link.

4. The combination with a mirror, of an angular supporting link having a long and a short arm, the long arm being pivoted to the mirror, a series of supporting links joined to each other, one end link of the series being pivotally connected to the short arm of the angular link, the link at the opposite end of the series of links being provided with a relatively soft mouthpiece, each link of the series of supporting links being formed at one end with a notch and at the other end with a laterally projecting lug, the lug of one link entering the notch of the adjacent link, and thus limiting the relative movement of the links in one direction.

In testimony whereof I affix my signature in presence of two witnesses.

CURTIS S. BUZBY. [L. S.]

Witnesses:
HARRY BELTZ,
OLIVER M. KNAPPENBERGER.